US010304442B1

(12) United States Patent
Rudden et al.

(10) Patent No.: US 10,304,442 B1
(45) Date of Patent: May 28, 2019

(54) IDENTIFYING DIGITAL PRIVATE INFORMATION AND PREVENTING PRIVACY VIOLATIONS

(71) Applicant: INTERNATIONAL BUSINESS MACHINES CORPORATION, Armonk, NY (US)

(72) Inventors: Beth Rudden, Denver, CO (US); Dennis Anthony Perpetua, Jr., Jay, NY (US); Bernard Freund, Victoria (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/123,652

(22) Filed: Sep. 6, 2018

(51) Int. Cl.
| | |
|---|---|
| *G06F 17/20* | (2006.01) |
| *G06F 17/27* | (2006.01) |
| *G10L 15/18* | (2013.01) |
| *G06F 21/60* | (2013.01) |
| *G10L 15/06* | (2013.01) |

(52) U.S. Cl.
CPC ...... *G10L 15/1822* (2013.01); *G06F 17/2765* (2013.01); *G06F 21/60* (2013.01); *G10L 15/063* (2013.01)

(58) Field of Classification Search
CPC .......... G10L 15/1822; G10L 15/063; G06F 21/60; G06F 17/2765
USPC ............... 704/9, 231, 246, 251, 257, 275
See application file for complete search history.

(56) References Cited

U.S. PATENT DOCUMENTS

| | | |
|---|---|---|
| 7,500,008 B1 | 3/2009 | Jerrard-Dunne |
| 8,244,531 B2 | 8/2012 | Erhart et al. |
| 9,330,183 B2 | 5/2016 | Woss et al. |
| 9,330,277 B2 | 5/2016 | Hurwitz et al. |
| 9,544,438 B1 | 1/2017 | Andraszek et al. |
| 9,781,266 B1 | 10/2017 | Koster |
| 2009/0265326 A1 | 10/2009 | Lehrman et al. |
| 2011/0029566 A1 | 2/2011 | Grandison et al. |

(Continued)

OTHER PUBLICATIONS

Haack, W., et al., "Security Analysis of the Amazon Echo", May 18, 2017, 14 pgs.

(Continued)

*Primary Examiner* — Thierry L Pham
(74) *Attorney, Agent, or Firm* — William Hartwell; Matthew M. Hulihan; Heslin Rothenberg Farley & Mesiti PC

(57) ABSTRACT

Identifying private information and preventing privacy violations is provided by a process that evaluates digital information obtained by an organization as part of a digital information stream from a user. The evaluating identifies a user utterance, including keyword(s), entity/ies, and intent(s), and applies natural language understanding to the digital information to ascertain a contextual understanding for the user utterance. The process selects training set(s) of historical information from available training sets that includes vocabulary used in varying contexts. The process compares the identified user utterance to an ontology based on the selected training set(s), and determines a confidence level that the digital information includes digital private information. The process also flags for the organization an action to take with respect to handling of the digital information. The flagging is based on the determined confidence level that the digital information includes digital private information.

20 Claims, 7 Drawing Sheets

(56) References Cited

U.S. PATENT DOCUMENTS

2014/0025702 A1    1/2014   Curtiss et al.
2014/0337317 A1   11/2014   Woss et al.
2017/0013127 A1    1/2017   Xue et al.

OTHER PUBLICATIONS

Brill, H., et al., "Little Things and Big Challenges: Information Privacy and the Internet of Things", Am. UL Rev. 66, 2016, pp. 1183-1230.

Mell, Peter, et al., "The NIST Definition of Cloud Computing", NIST Special Publication 800-145, Sep. 2011, Gaithersburg, MD, 7 pgs.

IDENTIFYING DIGITAL PRIVATE INFORMATION AND PREVENTING PRIVACY VIOLATIONS

BACKGROUND

Consumer devices, such as smartphones, tablets, home smart speakers with virtual assistants, and others, include "digital assistant" features that passively listen to all sounds in the vicinity of the device in an attempt to identify voice commands made by users and provide assistance with a variety of tasks. To function, those devices capture the aforementioned sounds and transmit them over the Internet to the device manufacturer where they are processed for recognition of the owner's voice, word identification, and recognition of intents using artificial intelligence techniques. They are transformed to digital text and sent back to the devices for further processing, and copies are kept in a cloud provider for further analysis and for continual improvement of the services provided to the consumers.

Storage of user's provided information, either in the original audio form or a translated version, may violate local or other applicable privacy laws of a jurisdiction (e.g. country or state/province) where the consumer resides, exposing the service provider to potential criminal and civil liability as a result, as well as reputational damage and loss of public confidence due to real or perceived privacy violations. Accordingly, approaches are needed for appropriately identifying private information and flagging actions for handling that information, to prevent such real or perceived privacy violations.

SUMMARY

Shortcomings of the prior art are overcome and additional advantages are provided through the provision of a computer-implemented method. The method evaluates digital information obtained by an organization as part of a digital information stream from a user. The evaluating includes identifying a user utterance in the digital information, including one or more keywords, one or more entities, and one or more intents, and applying natural language understanding to the digital information to ascertain a contextual understanding for the user utterance. The method further selects one or more training sets of historical information from a plurality of available training sets comprising vocabulary used in varying contexts, the selecting being based on the ascertained contextual understanding. The method compares the identified user utterance to an ontology based on the selected one or more training sets, and determines, based on the comparing, a confidence level that the digital information comprises digital private information. The method also flags for the organization an action to take with respect to handling of the digital information, the flagging being based on the determined confidence level that the digital information comprises digital private information.

Further, a computer system is provided that includes a memory and a processor in communication with the memory. The computer system is configured to perform a method. The method evaluates digital information obtained by an organization as part of a digital information stream from a user. The evaluating includes identifying a user utterance in the digital information, including one or more keywords, one or more entities, and one or more intents, and applying natural language understanding to the digital information to ascertain a contextual understanding for the user utterance. The method further selects one or more training sets of historical information from a plurality of available training sets comprising vocabulary used in varying contexts, the selecting being based on the ascertained contextual understanding. The method compares the identified user utterance to an ontology based on the selected one or more training sets, and determines, based on the comparing, a confidence level that the digital information comprises digital private information. The method also flags for the organization an action to take with respect to handling of the digital information, the flagging being based on the determined confidence level that the digital information comprises digital private information.

Yet Further, a computer program product including a computer readable storage medium readable by a processing circuit and storing instructions for execution by the processing circuit is provided for performing a method. The method evaluates digital information obtained by an organization as part of a digital information stream from a user. The evaluating includes identifying a user utterance in the digital information, including one or more keywords, one or more entities, and one or more intents, and applying natural language understanding to the digital information to ascertain a contextual understanding for the user utterance. The method further selects one or more training sets of historical information from a plurality of available training sets comprising vocabulary used in varying contexts, the selecting being based on the ascertained contextual understanding. The method compares the identified user utterance to an ontology based on the selected one or more training sets, and determines, based on the comparing, a confidence level that the digital information comprises digital private information. The method also flags for the organization an action to take with respect to handling of the digital information, the flagging being based on the determined confidence level that the digital information comprises digital private information.

An advantage of the above method is that it can intelligently and automatically identify private information, flag it appropriately, and help organizations avoid privacy violations that might otherwise occur.

In some embodiments, the confidence level reflects a confidence that the digital information includes information legally defined to be protected private information and/or information considered by the user to be private information. This has an advantage that the information is considered for both legally-defined and locality-based privacy considerations.

In some embodiments, wherein the contextual understanding informs of privacy requirements applicable to the digital information, and the selected training sets are reflective of the privacy requirements applicable to the digital information. This has an advantage in that it can distinguish between information that may be private in one context but is not private in other contexts. Providing a large set of training sets has an advantage in that many different contexts may be represented. Selecting a subset of that broader set has an advantage in that the ontology and comparison of the utterance is tailored to the particular context under which the utterance was observed, which tailors the privacy determination to the particular situation.

In some embodiments, the contextual understanding for the user utterance includes an understanding of applicable locality of the user, the locality including cultural, language, physical location, moral, social, and/or mores-based associations of the user. Consideration for the locality has an advantage in that it goes beyond mere legal considerations of what constitutes 'private' information. Locality factors can all inform whether a particular user or group of users (e.g. of that locality) consider the information to be private, regardless of what legal protections exist for that information.

In some embodiments, the contextual understanding for the user utterance includes an understanding of legal requirements applicable to retention of the digital information, and the determined confidence level is reflective of a confidence that retaining the digital information falls within a scope of an applicable jurisdictional legal requirement. This has an advantage in that information that is illegal to retain may be identified and flagged for appropriate action (e.g. deletion or special treatment).

In some embodiments, determining the confidence level accounts for a situational awareness of the digital information stream, the situational awareness including additional information such as an audio analysis of audio of the digital information stream, and/or device measurements from at least one sensor of a device from which the digital information stream is captured. Accounting for situational awareness has an advantage in that it can provide additional information not encompassed by the conceptual understanding but nonetheless providing user information about the context.

In some embodiments, the method further includes comparing the determined confidence level to a threshold set by the organization, and selecting the action based on whether the determined confidence level exceeds the threshold. Selection of the action from several possible actions has an advantage that it provides tailored handling of the information, rather than a general indication that the information is private.

In embodiments, the action selected includes deleting the digital information, flagging the digital information for further review by the organization, raising an alert to the user and/or organization informing that the digital information includes digital private information, and/or retaining the digital information. These different actions provide advantages in that digital private information can be handled in a manner appropriate for the situation.

In some embodiments, the comparing includes classifying the user utterance using a classifier trained from the one or more training sets. Usage of a classifier has an advantage in that it provides automated and intelligent classification for utterances, while providing opportunities for further machine learning and refining based on feedback.

In some embodiments, the method further includes initiating automatic performance of the flagged action, where the action is deleting the digital information or archiving the digital information. Initiation of automatic performance of action(s) has an advantage in that it avoids a manual or user review, providing the ability to quickly trigger actions that may be time-sensitive. They also alleviate potential other human intervention to handle the data appropriate.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
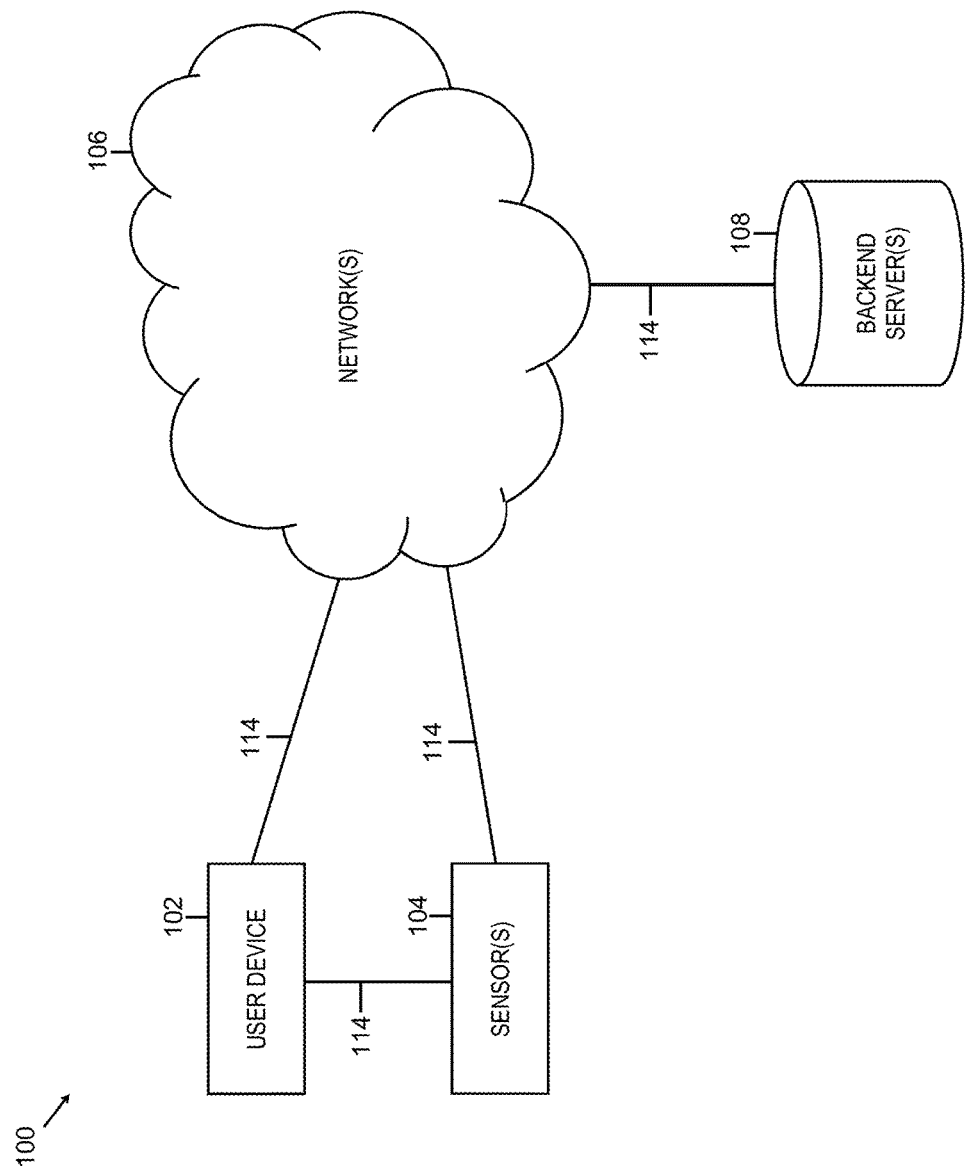
FIG. 1 depicts an example environment to incorporate and/or use aspects described herein.

As noted, there are potential legal and business ramifications to whether and how an organization handles (retains, transfers, stores, uses, etc.) collected digital information. Digital private information is private information in a digital format, such as a stored audio or other data file that contains private information of user(s). Aspects described herein provide artificial intelligence systems to identify real or perceived private information contained in or derived from user utterances, such as those in audio form, converted natural language processing (NLP) text form, or the like. In the context of audio-based virtual assistants, users provide utterances initially in audio form. These audio utterances may additionally be converted into text or other formats for storage. The detection and possible actions taken in response to the collection of digital private information, in accordance with aspects described herein, can offer protections to an individual's privacy. They can also offer protections from legal action, reputational damage, and loss of public confidence, as examples, to the involved organizations, for instance device manufacturers, cloud service providers, and any other involved organizations who may be affected by the handling of this information.

Aspects provide organizations using the system with an indication (e.g. a probability or likelihood) about whether information captured by, e.g., voice recognition systems included in software or business/consumer devices, is, or is expected to be, perceived as private by the users of those devices or software. Whether information is private may be ascertained based on legal and other 'locality' considerations, for instance social norms, mores, language, physical locations, cultural considerations, and other contextual considerations. An indication is provided of a probability or confidence that retainment or other particular handling of the digital private information falls within a scope of applicable laws or regulations of a given jurisdiction, for instance that it is a legal violation to retain such information, in conjunction with any applicable 'locality' contextual considerations. Further processing can raise flags for manual or automated actions to be performed with respect to the handling of the digital information.

In some embodiments, capabilities and processing described herein are incorporated by manufacturers into consumer or business products that include voice recognition capabilities, such as smart televisions or streaming devices, smartphones, digital assistants, and other consumer devices, as examples. More generally, aspects can be incorporated into and/or leveraged by any devices that obtain or process an audio stream, looking for not only keywords but other items to trigger further processing. Some devices may not require explicit activation, for instance a wake word/ phrase, and instead proactively monitor an audio stream in order to identify interesting utterances for processing. By way of specific example, a system installed in a car might continuously monitor conversations and other audio within the car's cabin and proactively identify opportunities to look up and provide additional information to occupants.

FIG. 1 depicts an example environment to incorporate and/or use aspects described herein. Environment 100 includes a user device 102 of a user, for instance a mobile device (a smartphone, tablet, wearable device, etc.), smart speaker, or other computer system. Also shown in the environment are sensor(s), for instance audio sensors (microphones) for detecting and providing an audio stream. This example shows user device 102 and sensors 104 in communication with each other. The communication is in one example a direct wireless connection, for instance a Bluetooth® wireless connection (BLUETOOTH is a registered trademark of Bluetooth SIG, Inc., Kirkland, Wash., U.S.A.). In other embodiments, only one of user device 102 and sensors 104 are included in the environment, and/or they are not in direct communication as shown in FIG. 1. Typically, though not always, sensor devices to capture audio will be in communication with a local computer system, such as a user device or other host.

User device 102 is in communication with network(s) 106, which may include any one or more networks, such as one or more local area networks and/or one or more wide area networks, such as the internet. In this example, sensors 104 are also in communication directly with network(s) 106, though in other examples they may not have a separate connection to network(s) 106. Devices 102, 104 may be in communication with network(s) 106 via wired or wireless communications links, such as wired and/or cellular, Wi-Fi, or other types of wireless connections.

In particular embodiments, user device 102 and/or sensors 104 are, or are incorporated into, smart devices in communication with a home automation server, smart hub, or other edge device that is installed in the environment 100. Such devices may be in communication with network(s) 106 via the server, hub, or other edge device.

Shown across network(s) 106 from devices 102, 104 are backend server(s) 108. Backend server(s) 108 represent backend (i.e. remote from user/user devices) processing facilities, including one or more computer systems. In some examples, the backend servers are provided by a cloud facility on behalf of customers who are organizations, such as device manufacturers or software vendors. In particular examples, the backend server(s) 108 receive data from devices 102/104, for instance audio data that may or may not have been preprocessed by devices 102/104, and perform processing as described herein. In yet further embodiments, backend server(s) 108 encompass facilities for retaining data, such as collected streams of audio and/or data collected from processing such collected audio streams. In some examples, backend server(s) 108 process collected audio streams for recognition of a user's voice, word identification, and recognition of intents, for instance using artificial intelligence techniques.

The components in FIG. 1 form wired or wireless network(s), and communication between the devices takes place via wired or wireless communications links 114 for communicating data between the devices. FIG. 1 is just one example of an environment to incorporate and use aspects described herein.

Example processes leverage inputs that include (i) historical training data, and (ii) a stream of keywords, entities, and intents generated by, e.g., for instance, a cloud provider's natural language processing, understanding, and classification systems. Such "stream" originates from audio in some embodiments, but in other embodiments originates in whole or part from another form of input. Those skilled in the art will recognize that user utterances can contain "entities", referring to the subject of the action (typically a noun), and "intents", referring generally to the user intentions—the correlation between what the user says and the action to take in response.

The historical training data is generated through the ingestion of any of various sources of information that include (but are not limited to): legislation for each of several jurisdictions; court recordings, pleadings, judgements, warrants and other legal records for each of several jurisdictions; movie and theatre scripts; books and novels; and any other documents or information that may help an artificial intelligence system to understand what constitutes private information (in a legal sense), and what could be, might be, or is perceived as private information by the general public or specific users, regardless of its legal basis, e.g. as part of an applicable 'locality'.

Training data such as the example data above can provide context to phrases and utterances that users might provide. In other words, the data contains information that can inform or provide a broader set of context than what is readily recognizable from the stream alone. If, for instance, words or phrases are often used together in a particular context as ascertained from the training data, then the use of a subset of those words or phrases in an audio stream might suggest that the particular context applies to the user's current situation. Thus, the stream can be analyzed for a contextual understanding that can suggest personal or private information is part of what is being captured.

Training data corresponding to each of several languages and/or localities (encompassing such features as culture, language, physical location, mores, geography) relative to the end user, may be processed by a system using, for instance, a lexical database for the respective language. The lexical database can be a public database, such as WordNet or GermaNet, or a proprietary database provided by an organization, for instance the organization collecting streams or another organization offering aspects described herein as a service to other organizations that collect the streams.

In an embodiment, a process evaluates the stream by comparing identified keywords, entities, and utterances (combinations of one or more entities with one or more intents) with a set generated from the historical training sets. The process calculates a probability that the collected information (a portion of the stream) contains information that would be considered "private" by a lay person, a specific user, and/or by a legal definition of protected private information applicable to a specific jurisdiction, for instance a jurisdiction in which the user is located or has indicated as being applicable. One or more obtained probabilities can then be compared to threshold value(s) configured for or by the organization using the system.

Accordingly, a process can evaluate digital information obtained by an organization as part of a digital information stream from a user, for instance an audio stream captured by a user device, or the NLP output from processing the audio stream. The evaluating can include identifying a user utterance in the digital information, including one or more keywords, one or more entities, and one or more intents, and applying natural language understanding to the digital information to ascertain a contextual understanding for the user utterance. Contextual understanding can refer to the 'locality', legal, jurisdictional, geographic, or any other considerations relevant to whether the information is considered private or personal information.

The process can select an appropriate one or more training sets of historical information from a larger set of available training sets that include vocabulary used in varying contexts. The selecting can be based on the ascertained contextual understanding. So, by way of example, if a user utterance is captured by a user entering a doctor's office, the relevant training sets might include literature relating to the medical field, patient rights, patient information, and health data laws and regulations, among other training data. Some situational information (for instance the fact that the user is entering a doctor's office) might be gleaned from sensor data of the user device (GPS data), user content (calendar appointments), or any other information available.

The identified user utterance can be compared to an ontology, e.g. one based on, constructed, or derived from the selected one or more training sets. Based on this comparison, a confidence level that the digital information includes digital private information can be determined. The confidence level may be very high that the information does or does not include digital private information. Appropriate action(s) can be flagged for the organization to take with respect to handling of the digital information. The flagging is based on the determined confidence level that the digital information includes digital private information. For instance, if it is determined with high confidence that the information includes digital private information, the information can be flagged for prompt deletion. If the information is confidently identified as not including private information, it may be flagged for storage, archival, and further use, for example.

In particular embodiments, the comparison of the utterance to the ontology includes a classification of the user utterance using a classifier trained from the one or more training sets. In this regard, a trained classifier may be applied to portions, e.g. utterances, of the stream to classify those portions of the stream. Example such classification is natural language understanding (NLU). With NLU classification comes a confidence score about that understanding. A training or feedback loop can be incorporated to continually improve the classification that occurs, refine training data sets, and train the proper selection of the training sets. Additionally or alternatively, natural language processing (NLP), which also presents a confidence score, is leveraged to characterize utterances.

The aforementioned confidence level can reflect a confidence that the digital information includes (i) information legally defined to be protected private information and/or (ii) information considered by the user to be private information. In this regard, what is considered "private" can be of varying objectivity or subjectivity. General regional, cultural, or moral contexts, as examples, might apply to groups of associated users to suggest what is considered to be private to that group. Contextual understanding informs of privacy requirements applicable to the digital information, and the selected training sets can be reflective of those privacy requirements applicable to digital information. In some aspects, the contextual understanding for a user utterance can include an understanding of applicable locality of the user, the locality including cultural, language, physical location, moral, social, and/or mores-based associations of the user. Additionally or alternatively, the contextual understanding for the user utterance can include an understanding of legal requirements having a scope into which the digital information falls, e.g. applicable to retention of such digital information. The confidence level can reflect a confidence that retaining the digital information violates an applicable jurisdictional legal requirement, for instance.

Regarding the flagged actions, the confidence level can be compared to a threshold set by the organization and appropriate action(s) selected based on whether the determined confidence level exceeds the threshold. Further processing of stream content that generates a probability/confidence value below the threshold may be avoided, instead prompting such information to be passed back to the organization for its desired use.

Different organizations have different tolerances for risk. Organizations can therefore set threshold(s) appropriate to their needs. One organization might set a threshold at '0.5 or above', indicating information determined with 50% or higher confidence of containing digital private information is to be removed, another threshold at 0.3, indicating that information determined with between 30% and 49.9% confidence of containing digital private information is to be flagged for manual inspection, and a third threshold of '<30%' indicating information determined with less than 30% confidence of containing digital private information is to be passed on for retention. A different organization with more tolerance for risk might set higher thresholds, i.e. requiring a higher degree of certainty that the information is private before it triggers deletion or review. The probability/confidence score for an utterance is a function involving contextual factors, and an organization tailors the information handling to its needs by tailoring the threshold(s) to which the confidence score is compared.

Accordingly, stream content that generates probability values above a defined threshold may be flagged for particular actions. Stream content that generates probability values below defined thresholds may additionally be flagged for particular action(s), if desired. Example possible flags indicate archival for legal retention, immediate removal, alert to the organization using the system, alert to the user who generated the stream, and/or other custom flag options defined by the organization using the system and/or defined by the individual users.

Thus, in some embodiments, the action selected and flagged for the organization includes deleting the digital information or indicating it as targeted for further review by the organization. The action could be to raise an alert to the user, an administrator, or any other user informing that the digital information includes digital private information. In some examples, the action flagged includes retaining the digital information.

Additionally, a process can initiate automatic performance of the flagged action. For instance, automatic performance can include automatically deleting the digital information or archiving the digital information.

Aspects presented herein also include an optional module for situational processing, for instance to leverage situational characteristics from mobile devices. The determination of the confidence level can account for a situational awareness of the digital information stream. This situational awareness can include additional information, for instance an audio analysis of audio of the digital information stream and/or device measurements from at least one sensor of a device from which the digital information stream is captured. If the organization using the system chooses to enable this optional situational processing module, then, after an initial evaluation of digital information for private content, and before being flagging the content for action, the system can use this additional information that is provided in conjunction with the stream to adjust the probability/confidence that is compared with the organization-defined threshold(s).

Examples of such additional information can include, but are not limited to: frequency, peak magnitude and resolution bandwidth measured by a spectrum analyzer; vibration, acceleration, and orientation degree changes measured by an accelerometer; common or typical, pinned and scheduled locations recorded by GPS, network triangulation, or other location services; emotion, sentiment and tone characteristics measured by a tone analyzer; and any other device measurements that can be custom-defined by the organization using the system.

Figure 2:
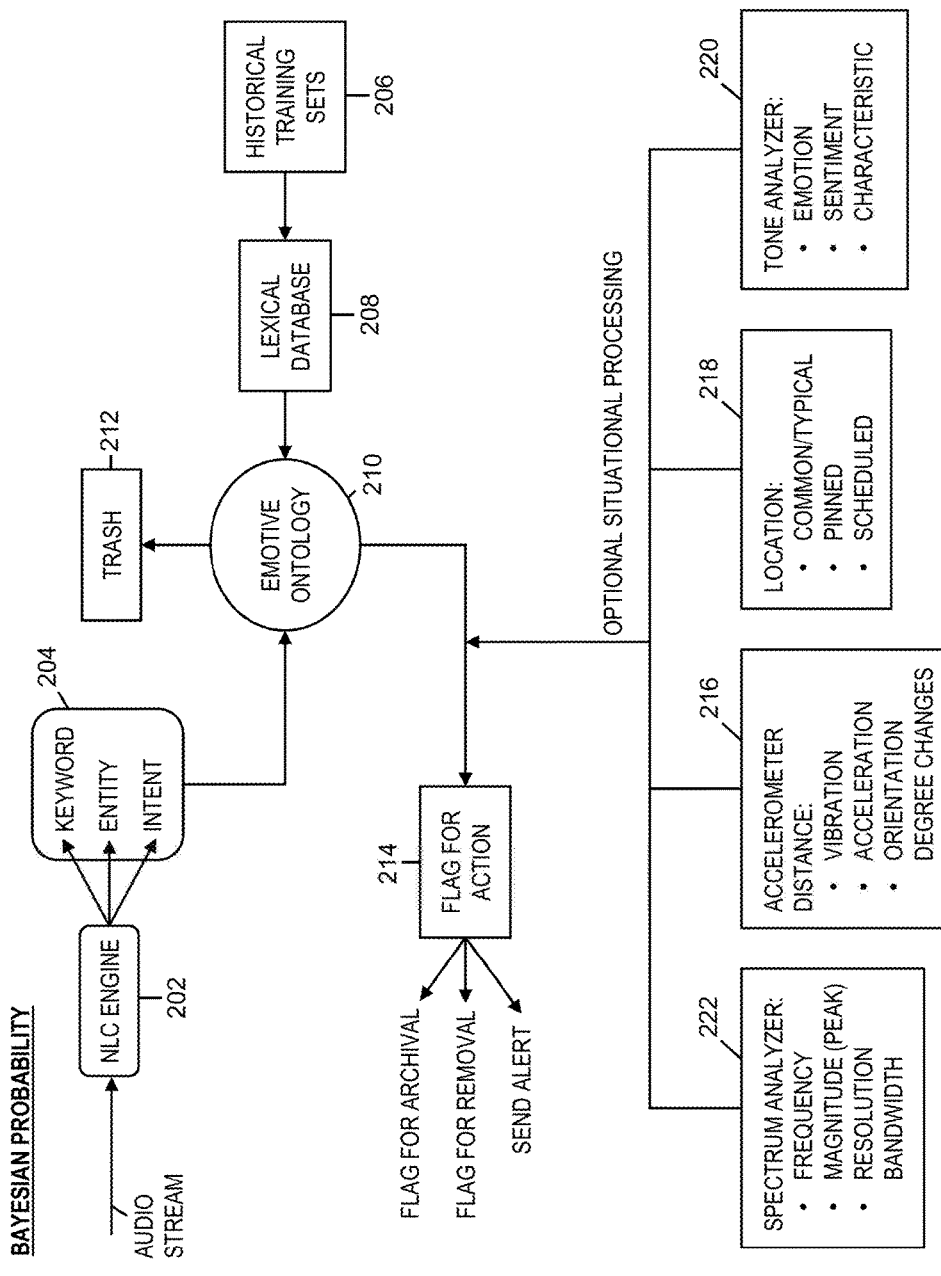
FIG. 2 depicts an example conceptual diagram of identifying digital private information and preventing privacy violations, in accordance with aspects described herein.

Further aspects of the above are presented with reference to FIG. 2, which depicts an example conceptual diagram of identifying digital private information and preventing privacy violations, in accordance with aspects described herein. An audio stream is fed into a natural language classification (NLC) engine 202 that identifies user utterances 204 including keywords, entities, and intents from the stream. Meanwhile, historical training sets 206 are input to a lexical database 208 to produce an emotive ontology 210. Relationships are identified and built between concepts that vary based on context. This aspect produces an emotive ontology that is contextually significant to the stream being analyzed. The ontology is, in this regard, a set of contextually-appropriate training sets containing a tailored set of rules for the particular context (legal and locality-based). The utterances from the NLC engine 204 are fed as input into the emotive ontology 210 for comparison, and the ontology 210 informs flag(s) for action 214, for instance based on the thresholds described above. Here, the flags are selected from a flag for archival, flag for removal, and flag for an alert. Flagging for an alert is not exclusive from other actions, such as deleting or archiving the data. Another example flag is to flag for further review, for instance by an administrator or other user. Utterances not containing private information and/or for which not flagging is desired may be disregarded (represented by Trash 212).

In some embodiments, there are threshold(s) that could apply before the ontological comparison is made. An example such threshold is one set for the NLC engine 202. NLC might cause a flag for action without processing using the emotive ontology. For example, if the NLC identifies particular entities, intents, or keywords that are so obviously private information in any context, the information might be automatically flagged for removal.

The above aspects of FIG. 2 leverage a contextual awareness understanding for identifying digital private information and flagging appropriate actions. Such contextual understanding may be applicable to devices such as home alarm systems and smart speakers with virtual assistants designed for home use, which inherently provide at least some contextual awareness (home use, static and particular physical location, etc.). Meanwhile, the tasks performed by the device from which a stream is acquired can inform context; the applications of a home virtual assistant are generally much broader than the specific application of a home security system. This provides contextual awareness into how the device is being used. Contextual awareness factors into what training sets are selected, as explained above.

Optional situational processing is also provided as conceptually depicted in FIG. 2. Influences of accelerometer distance 216, location information 218, and audio properties (tone analysis 220, spectrum analysis 222) are optionally accounted-for as part of a situational awareness for encountered utterances of the stream. Mobile devices in particular tend to be used in many different contexts and scenarios. Some items like tone analysis can apply in both contextual understanding and situational awareness. Situational characteristics, like the ones mentioned above, can help identify outlying readings, distance measures, and Markhov Blanket thresholds, as examples, to factor into other aspects of the process, for instance classification, confidence determinations, and action flagging.

Thus, the situational processing can influence any desired aspects of the overall process, for instance the confidence that something is private information, flag(s), and/or rules associated with flag(s). Audio spectrum analysis, accelerometer readings, location information, and/or tone analysis information, as depicted in FIG. 2, could be provided with the stream and factor into the probability/confidence that is compared with the organization-defined threshold(s), for instance. Additionally or alternatively, situational awareness might inform alerts to be sent regardless of whether the information is private. For instance, situational information like tone, audio characteristics, location, or mobile device movement data provided with private information might suggest that the user is in danger. Since the private information may not legally be retained, it might be flagged for removal. However, because of the situational awareness, an alert may be automatically sent, for instance to law enforcement, with some level of information (which may or may not be some or the private information).

Some primitive methods to detect private information rely on specific time stamps, locations, and/or keywords within speech. In contrast, aspects described herein leverage sophisticated artificial intelligence techniques to recognize private information without an exhaustive list of keywords.

In addition, aspects described herein are not limited to specific types of devices, for instance call-recording devices in call centers. Instead, aspects can be used with home automation devices, mobile devices and any other computer systems, smart appliances, and other devices generating audio streams. In addition, aspects can be used in real time with such devices.

Further features described herein include the use of natural language processing and machine learning algorithms to harvest dynamic based privacy requirements ('locality') and creation of contextual-based ontological systems that are employed through a rule-based engine. A machine learning capability is leveraged to build an ontology that feeds an NLP-based detection mechanism to trigger rules in the system. An additional layer of rule capability in terms of situational awareness may also be leveraged, e.g. to process accelerometer, location, tone, and audio spectrum awareness.

Aspects described herein also differ from approaches that rely on specific privacy rules in meta-content accompanying the content for analysis. Instead, features of embodiments described herein can use sophisticated artificial intelligence techniques to recognize private information without the need for explicit rules accompanying the content.

As yet further distinctions from other approaches that focus on connecting content and preventing it from being aggregated in a form that discloses private information, approaches described herein can treat each content stream individually in terms of its contextual and situational understanding, regardless of other content that may exist, and focus on detecting and optionally removing targeted private information in portions of collected streams.

Additionally, aspects described herein are not limited to person-to-person sharing, for instance, and can process 'background audio' for potential private information by leveraging NLP to detect signals to help flag actions with respect to digital private information.

Figure 3:
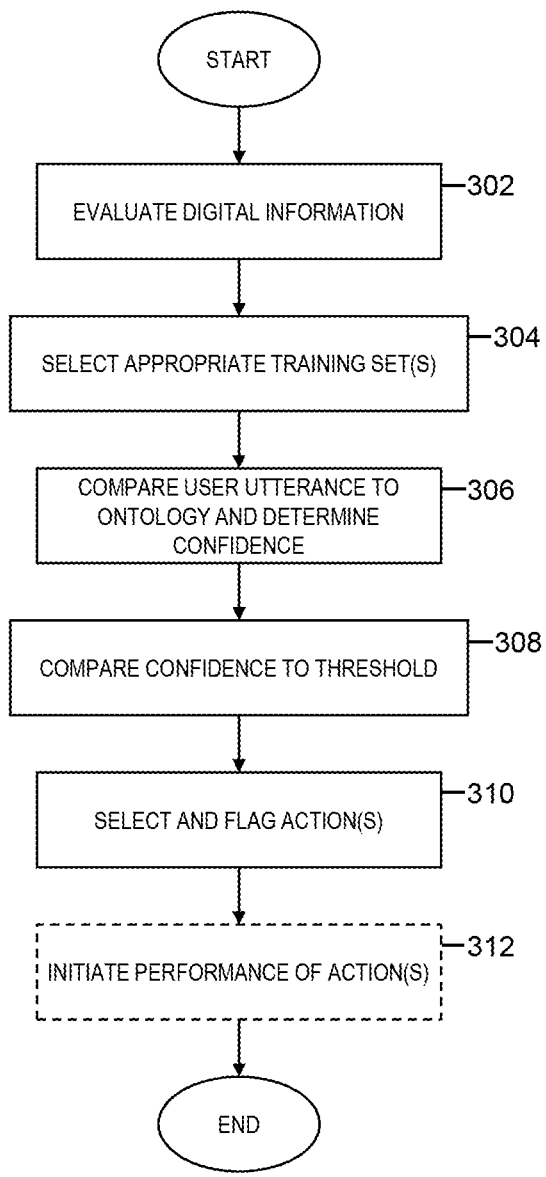
FIG. 3 depicts an example process for identifying digital private information and preventing privacy violations, in accordance with aspects described herein.

FIG. 3 depicts an example process for identifying digital private information and preventing privacy violations, in accordance with aspects described herein. In some examples, the process is performed by one or more computer systems, such as those described herein, which may include one or more backend servers, one or more user devices, and/or one or more other computer systems. An advantage of the process of FIG. 3 is that it can intelligently and automatically identify private information, flag it appropriately, and help organizations avoid privacy violations that might otherwise occur.

Figure 4:
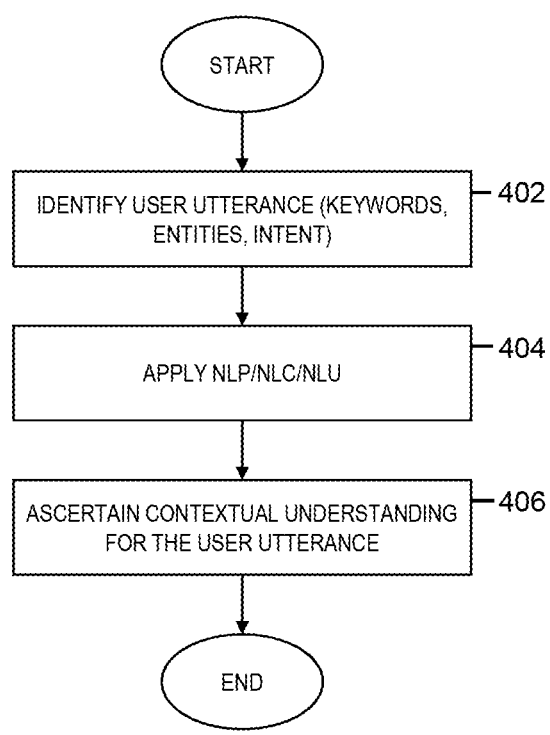
FIG. 4 depicts an example process for evaluating digital information, in accordance with aspects described herein.

The process begins by evaluating digital information obtained by an organization as part of a digital information stream from a user (302). An example process for evaluating digital information is depicted in FIG. 4. The process of FIG. 4 includes identifying a user utterance in the digital information, including one or more keywords, one or more entities, and one or more intents (402), and applying natural language processing (natural language understanding and/or natural language classification) to the digital information to ascertain (404) a contextual understanding for the user utterance. Ascertaining the contextual understanding has an advantage in that it informs what information may be considered private.

Returning to FIG. 3, the process selects one or more training sets of historical information (304) from a plurality of available training sets comprising vocabulary used in varying contexts. The selecting may be based on the ascertained contextual understanding. In some embodiments, the contextual understanding informs of privacy requirements applicable to the digital information, which has an advantage that it can distinguish between information that may be private in one context but is not private in other contexts. The selected training sets can be reflective of the privacy requirements applicable to the digital information. Providing a large set of training sets has an advantage in that many different contexts may be represented. Selecting a subset of that broader set has an advantage in that the ontology and comparison of the utterance is tailored to the particular context under which the utterance was observed, which tailors the privacy determination to the particular situation. Additionally or alternatively, the contextual understanding for the user utterance includes an understanding of applicable locality of the user. The locality can include at least cultural, language, physical location, moral, social, and/or mores-based associations of the user. Consideration for the locality has an advantage in that it goes beyond mere legal considerations of what constitutes 'private' information. Culture, morals, physical location, mores, social considerations, and other locality factors can all inform whether a particular user or group of users (e.g. of that locality) consider the information to be private, regardless of what legal protections exist for that information.

The contextual understanding for the user utterance can include an understanding of legal requirements applicable to retention of the digital information. Encompassing legal considerations over what is private information has an advantage because legal considerations can be a significant factor in whether information is private. The determined confidence level in this situation may be reflective of a confidence that retaining the digital information falls within a scope of an applicable jurisdictional legal requirement, for instance it is rendered unlawful to retain the private information. This has an advantage in that information that is illegal to retain may be identified and flagged for appropriate action (e.g. deletion or special treatment).

The process of FIG. 3 continues by comparing the identified user utterance to an ontology based on the selected one or more training sets and determining, based on the comparing, a confidence level that the digital information comprises digital private information (306). The confidence level can reflect a confidence that the digital information includes information legally defined to be protected private information, and/or information considered by the user to be private information. This has an advantage that the information is considered for both legally-defined and locality-based privacy considerations.

Determining the confidence level can account for a situational awareness of the digital information stream. The situational awareness can include additional information such as an audio analysis of audio of the digital information stream, and/or device measurements from at least one sensor of a device from which the digital information stream is captured. In some embodiments, the process performs the audio analysis, while in other embodiments, the process receives already-decoded audio. Accounting for situational awareness has an advantage in that it can provide additional information not encompassed by the conceptual understanding but nonetheless providing user information about the context.

In some examples, the comparing (306) can include classifying the user utterance using a classifier trained from the one or more training sets. Usage of a classifier has an advantage in that it provides automated and intelligent classification for utterances, while providing opportunities for further machine learning and refining based on feedback.

The process of FIG. 3 continues by comparing the determined confidence level to a threshold set by the organization (308). The process selects and flags an action (310) based on whether the determined confidence level exceeds the threshold. The flagging, for the organization, of an action to take with respect to handling the digital information may be based on the determined confidence level that the digital information includes digital private information. Flagging in this sense can include indicating, invoking, specifying, or the like. Selection of the action from several possible actions has an advantage that it provides tailored handling of the information, rather than a general indication that the information is private.

As noted, the selected action can include deleting the digital information, flagging the digital information for further review by the organization, raising an alert to the organization or user informing that the digital information includes digital private information, and/or retaining the digital information. These different actions provide advantages in that digital private information can be handled in a manner appropriate for the situation.

The process proceeds with an optional aspect of initiating automatic performance of the flagged action (312). In this regard, flagged actions can in some embodiments be automatically initiated and performed, absent and without user involvement. Automatic actions may be implemented in any desired circumstances, for instance when the process is sufficiently confident that the action is the correct one and/or when time is of the essence. The action for automatic performance can include, as examples, deleting the digital information or archiving the digital information. Initiation of automatic performance of action(s) has an advantage in that it avoids a manual or user review, providing the ability to quickly trigger actions that may be time-sensitive. They also alleviate potential other human intervention to handle the data appropriate.

Although various examples are provided, variations are possible without departing from a spirit of the claimed aspects.

Figure 5:
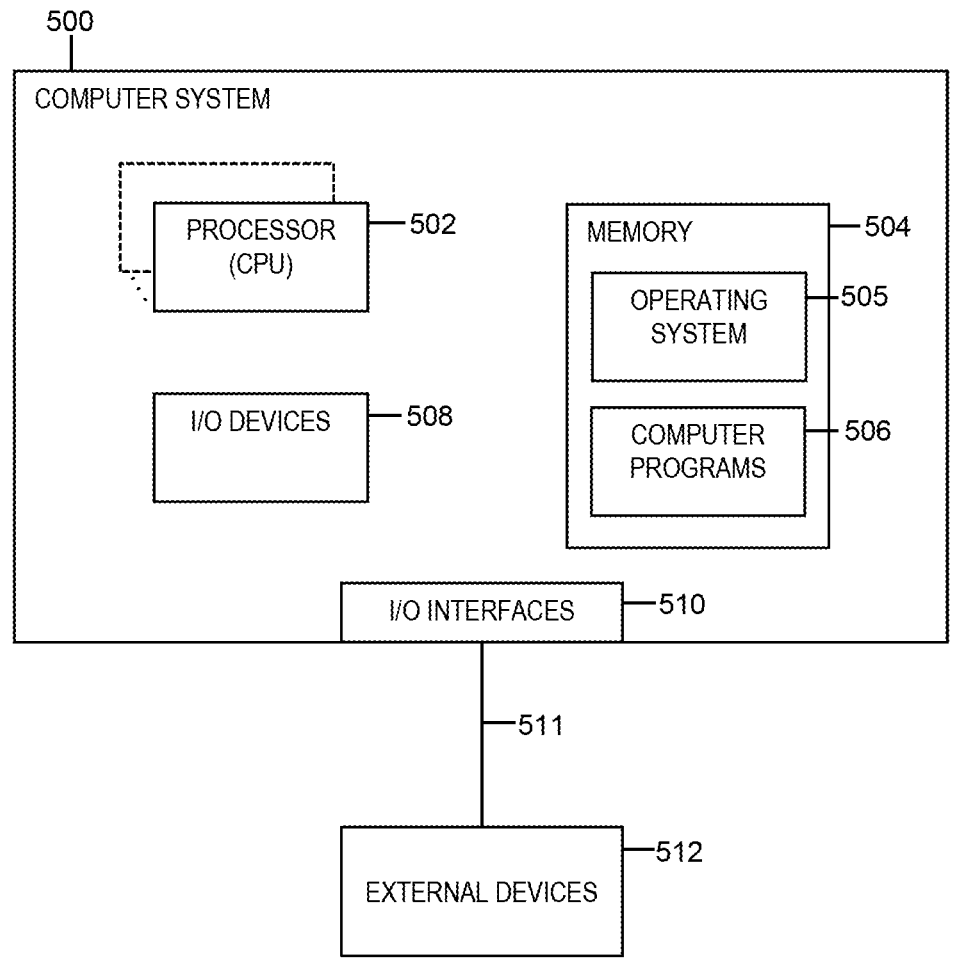
FIG. 5 depicts one example of a computer system and associated devices to incorporate and/or use aspects described herein.

Processes described herein may be performed singly or collectively by one or more computer systems, such as one or more backend servers, user devices, or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
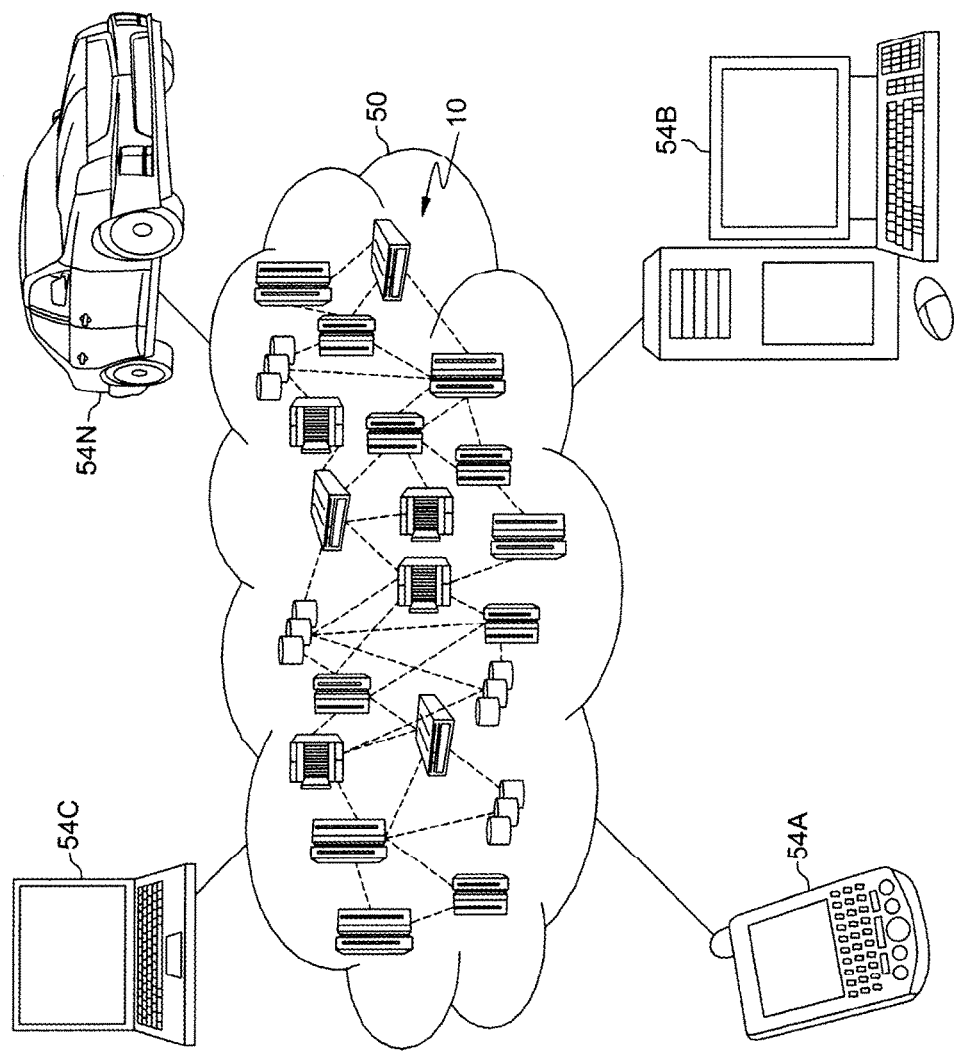
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
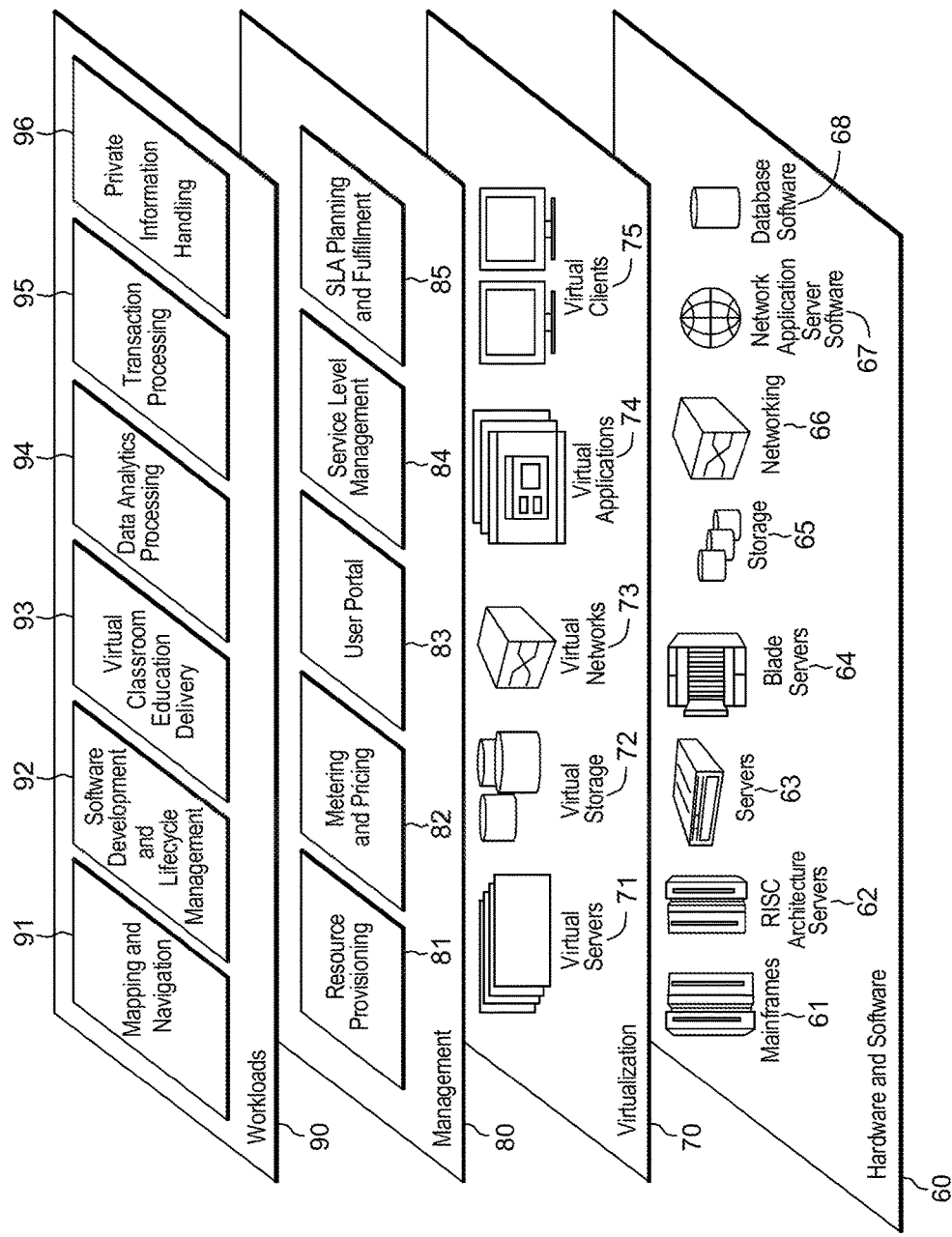
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and private information identification and handling 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    evaluating digital information obtained by an organization as part of a digital information stream from a user, the evaluating comprising:
        identifying a user utterance in the digital information, including one or more keywords, one or more entities, and one or more intents; and
        applying natural language understanding to the digital information to ascertain a contextual understanding for the user utterance;
    selecting one or more training sets of historical information from a plurality of available training sets comprising vocabulary used in varying contexts, the selecting being based on the ascertained contextual understanding;
    comparing the identified user utterance to an ontology based on the selected one or more training sets, and determining, based on the comparing, a confidence level that the digital information comprises digital private information; and
    flagging for the organization an action to take with respect to handling of the digital information, the flagging being based on the determined confidence level that the digital information comprises digital private information.

2. The method of claim 1, wherein the confidence level reflects a confidence that the digital information includes at least one selected from the group consisting of: information legally defined to be protected private information, and information considered by the user to be private information.

3. The method of claim 2, wherein the contextual understanding informs of privacy requirements applicable to the digital information, and wherein the selected training sets are reflective of the privacy requirements applicable to the digital information.

4. The method of claim 3, wherein the contextual understanding for the user utterance includes an understanding of applicable locality of the user, the locality comprising at least one selected from the group consisting of: cultural, language, physical location, moral, social, and mores-based associations of the user.

5. The method of claim 3, wherein the contextual understanding for the user utterance includes an understanding of legal requirements applicable to retention of the digital information, and wherein the determined confidence level is reflective of a confidence that retaining the digital information falls within a scope of an applicable jurisdictional legal requirement.

6. The method of claim 1, wherein the determining the confidence level accounts for a situational awareness of the digital information stream, the situational awareness comprising additional information selected from the group consisting of: an audio analysis of audio of the digital information stream, and device measurements from at least one sensor of a device from which the digital information stream is captured.

7. The method of claim 1, further comprising:
comparing the determined confidence level to a threshold set by the organization; and
selecting the action based on whether the determined confidence level exceeds the threshold.

8. The method of claim 7, wherein the action selected comprises deleting the digital information.

9. The method of claim 7, wherein the action selected comprises flagging the digital information for further review by the organization.

10. The method of claim 7, wherein the action selected comprises raising an alert to the user informing that the digital information comprises digital private information.

11. The method of claim 7, wherein the action selected comprises retaining the digital information.

12. The method of claim 1, wherein the comparing comprises classifying the user utterance using a classifier trained from the one or more training sets.

13. The method of claim 1, further comprising initiating automatic performance of the flagged action, where the action is selected from the group consisting of: deleting the digital information, and archiving the digital information.

14. A computer system comprising:
a memory; and
a processor in communication with the memory, wherein the computer system is configured to perform a method comprising:
evaluating digital information obtained by an organization as part of a digital information stream from a user, the evaluating comprising:
identifying a user utterance in the digital information, including one or more keywords, one or more entities, and one or more intents; and
applying natural language understanding to the digital information to ascertain a contextual understanding for the user utterance;
selecting one or more training sets of historical information from a plurality of available training sets comprising vocabulary used in varying contexts, the selecting being based on the ascertained contextual understanding;
comparing the identified user utterance to an ontology based on the selected one or more training sets, and determining, based on the comparing, a confidence level that the digital information comprises digital private information; and
flagging for the organization an action to take with respect to handling of the digital information, the flagging being based on the determined confidence level that the digital information comprises digital private information.

15. The computer system of claim 14, wherein the confidence level reflects a confidence that the digital information includes at least one selected from the group consisting of: information legally defined to be protected private information, and information considered by the user to be private information, wherein the contextual understanding informs of privacy requirements applicable to the digital information, and wherein the selected training sets are reflective of the privacy requirements applicable to the digital information.

16. The computer system of claim 15, wherein the contextual understanding for the user utterance includes an understanding of applicable locality of the user, the locality comprising at least one selected from the group consisting of: cultural, language, physical location, moral, social, and mores-based associations of the user.

17. The computer system of claim 14, wherein the determining the confidence level accounts for a situational awareness of the digital information stream, the situational awareness comprising additional information selected from the group consisting of: an audio analysis of audio of the digital information stream, and device measurements from at least one sensor of a device from which the digital information stream is captured.

18. A computer program product comprising:
a computer readable storage medium readable by a processing circuit and storing instructions for execution by the processing circuit for performing a method comprising:
evaluating digital information obtained by an organization as part of a digital information stream from a user, the evaluating comprising:
identifying a user utterance in the digital information, including one or more keywords, one or more entities, and one or more intents; and
applying natural language understanding to the digital information to ascertain a contextual understanding for the user utterance;
selecting one or more training sets of historical information from a plurality of available training sets comprising vocabulary used in varying contexts, the selecting being based on the ascertained contextual understanding;
comparing the identified user utterance to an ontology based on the selected one or more training sets, and determining, based on the comparing, a confidence level that the digital information comprises digital private information; and
flagging for the organization an action to take with respect to handling of the digital information, the flagging being based on the determined confidence level that the digital information comprises digital private information.

19. The computer program product of claim 18, wherein the confidence level reflects a confidence that the digital information includes at least one selected from the group consisting of: information legally defined to be protected private information, and information considered by the user to be private information, wherein the contextual understanding informs of privacy requirements applicable to the digital information, wherein the selected training sets are reflective of the privacy requirements applicable to the digital information, and wherein the contextual understanding for the user utterance includes an understanding of applicable locality of the user, the locality comprising at least one selected from the group consisting of: cultural, language, physical location, moral, social, and mores-based associations of the user.

20. The computer program product of claim 18, wherein the determining the confidence level accounts for a situational awareness of the digital information stream, the situational awareness comprising additional information selected from the group consisting of: an audio analysis of audio of the digital information stream, and device measurements from at least one sensor of a device from which the digital information stream is captured.

\* \* \* \* \*

UNITED STATES PATENT AND TRADEMARK OFFICE
CERTIFICATE OF CORRECTION

PATENT NO.         : 10,304,442 B1
APPLICATION NO.    : 16/123652
DATED              : May 28, 2019
INVENTOR(S)        : Rudden et al.

It is certified that error appears in the above-identified patent and that said Letters Patent is hereby corrected as shown below:

On the Title Page

At item (72) Inventors: delete "Beth Rudden, Denver, CO (US)" and insert -- Mary E. Rudden, Denver, CO (US) --

Signed and Sealed this
Seventeenth Day of November, 2020

Andrei Iancu
*Director of the United States Patent and Trademark Office*